(12) United States Patent
Kassubek et al.

(10) Patent No.: US 7,866,219 B2
(45) Date of Patent: Jan. 11, 2011

(54) MEASURING INSTRUMENT TO CAPTURE A PHYSICAL/CHEMICAL MEASURED VALUE

(75) Inventors: Frank Kassubek, Rheinfelden (DE); Lothar Deppe, Göttingen (DE); Rolf Disselnkötter, Mauer (DE); Steffen Keller, Karlsruhe (DE); Jörg Gebhardt, Mainz (DE); René Friedrichs, Rosdorf (DE); Beat Kramer, Windisch (CH)

(73) Assignee: ABB Patent GmbH, Ladenburg (DE)

( * ) Notice: Subject to any disclaimer, the term of this patent is extended or adjusted under 35 U.S.C. 154(b) by 408 days.

(21) Appl. No.: 11/892,293

(22) Filed: Aug. 21, 2007

(65) Prior Publication Data
US 2008/0047351 A1 Feb. 28, 2008

(30) Foreign Application Priority Data
Aug. 24, 2006 (DE) .................. 10 2006 039 774

(51) Int. Cl.
*G01F 1/80* (2006.01)
(52) U.S. Cl. .............. 73/861.355; 73/861.354
(58) Field of Classification Search .............. 73/570, 73/861.354–861.355
See application file for complete search history.

(56) References Cited

U.S. PATENT DOCUMENTS

| | | | |
|---|---|---|---|
| 5,907,491 A * | 5/1999 | Canada et al. .............. 700/108 |
| 6,292,108 B1 * | 9/2001 | Straser et al. .......... 340/870.11 |
| 7,050,894 B2 * | 5/2006 | Halm et al. .................... 701/33 |
| 7,291,014 B2 * | 11/2007 | Chung et al. .................. 434/11 |
| 7,342,504 B2 * | 3/2008 | Crane et al. ................. 340/612 |
| 2003/0101822 A1 * | 6/2003 | Atherton ...................... 73/649 |
| 2004/0246141 A1 * | 12/2004 | Tubel et al. .............. 340/854.3 |
| 2006/0250236 A1 * | 11/2006 | Ackley et al. ............... 340/540 |

FOREIGN PATENT DOCUMENTS

| | | |
|---|---|---|
| DE | 44 28 405 A1 | 2/1996 |
| DE | 10 2005 004 443 A1 | 8/2006 |
| WO | WO 2004/049281 A2 | 6/2004 |

* cited by examiner

*Primary Examiner*—Hezron Williams
*Assistant Examiner*—Nashmiya S Fayyaz
(74) *Attorney, Agent, or Firm*—Buchanan Ingersoll & Rooney PC

(57) ABSTRACT

A measuring instrument to capture a physical/chemical measured value, including a sensor unit, which is linked via a contactless interface to a transmitter unit, for passing on to a central analysis unit, wherein the sensor unit includes an at least partly internal sensor element which vibrates against a sensor housing because of operation, and which is linked, contactlessly and inside the sensor unit, for sensor signal transmission, via a first transmission/reception unit, to a complementary second transmission/reception unit, which is arranged at a fixed location relative to the sensor housing, and which is also linked, contactlessly and outside the sensor unit, to a third transmission/reception unit of the transmitter unit.

10 Claims, 1 Drawing Sheet

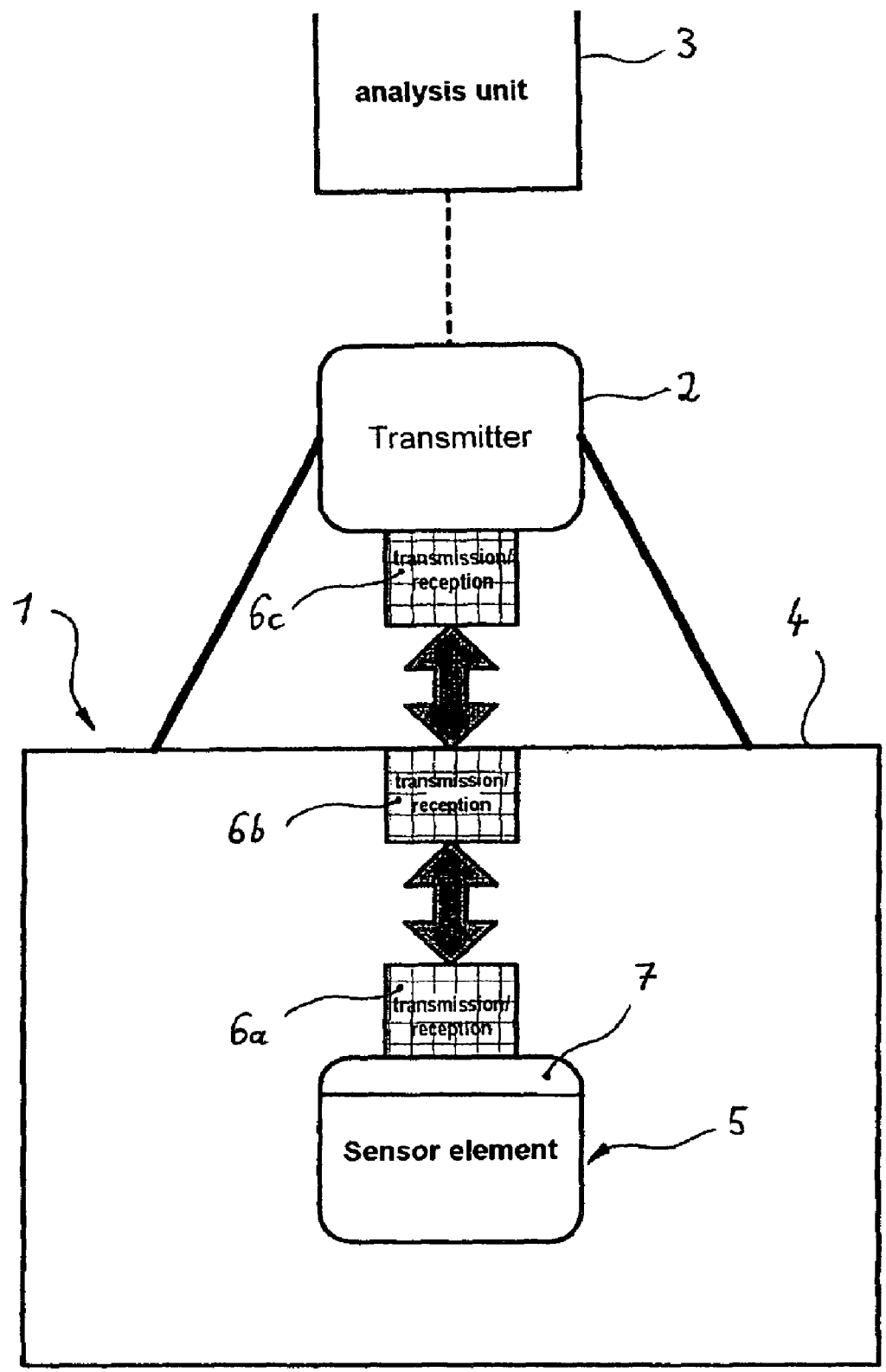

MEASURING INSTRUMENT TO CAPTURE A PHYSICAL/CHEMICAL MEASURED VALUE

RELATED APPLICATIONS

This application claims priority under 35 U.S.C. §119 to German Application 10 2006 039 774.6 filed in Germany on Aug. 24, 2006, the entire contents of which are hereby incorporated by reference in their entireties.

TECHNICAL FIELD

The disclosure relates to a measuring instrument to capture a physical or chemical measured value, including a sensor unit, which is linked via a contactless interface to a transmitter unit, for passing on to a central analysis unit.

BACKGROUND INFORMATION

In WO 2004/049281 A2, a generic measuring instrument which is part of a modular measuring arrangement is found. The modular measuring arrangement includes two measuring instruments of different kinds, which are connected to a central transmission/reception unit. Via the central transmission/reception unit, the measuring instruments are controlled and the further signal processing of the obtained measured values takes place. Each of the measuring instruments consists essentially of a sensor module and an electronics module, which can be coupled to each other via a contactless interface, via which energy is supplied to the sensor module and data is exchanged between the sensor module and the electronics module. The electronics module is also equipped with a transmission/reception unit for wireless data exchange with the central, fixed transmission/reception unit. Electrical energy can be supplied either via a supply line which is connected to the electronics module, or wirelessly, a photocell with battery or similar being integrated in the electronics module. The contactless interface between sensor unit and electronics module can be an inductive interface, which is formed on the transformer principle. Signals are transmitted via it, e.g., by amplitude modulation. This technical solution is aimed at a fixed positional arrangement of the sensor module relative to the electronics module. In the case of measuring instruments of which the sensor units are subject to operationally caused mechanical oscillations, and which must be arranged relative to the electronics module so that vibration is decoupled, an internal cable connection is used in a generally known manner. In particular, the transition from the fixed device housing to vibrating components which are arranged in it stresses these connecting cables very heavily. The connecting cables can also influence the oscillation behavior. To eliminate this disturbance variable, usually very light enameled wires without screening are used at this point, but this in turn is not secure against perturbing radiation.

SUMMARY

It is therefore the object of this invention to further improve a measuring instrument of the kind which is relevant here so that reliable signal transmission from a vibrating sensor element to a fixed transmitter unit is ensured.

The invention includes the technical teaching that the sensor unit includes an at least partly internal sensor element which vibrates against a sensor housing because of operation, and which is linked, contactlessly and inside the sensor unit, for sensor signal transmission, via a first transmission/reception unit, to a complementary second transmission/reception unit, which is arranged at a fixed location relative to the sensor housing, and which is also linked, contactlessly and outside the sensor unit, to a third transmission/reception unit of the transmitter unit.

The advantage of the solution according to the invention is, in particular, that because the signals are passed on in two stages, contactlessly and inside the measuring instrument, complete vibration decoupling of those components of the measuring instrument which move relative to each other takes place, so that device-internal cabling is completely unnecessary here.

As well as for pure sensor signal transmission between sensor element and transmitter unit, the transmission/reception units which are the subject of the invention can also be used for simultaneous transmission of operating energy between the components, so that additional components for this purpose can be omitted. The operating energy can be transmitted inductively, optically and similarly. The operating energy to be transmitted between the above-mentioned components can be in the power range between 100 mW and 500 mW, so that here, because the power is this low, the above-mentioned types of operating energy transmission can be used.

According to another technique which improves the invention, the transmission/reception units can be used for transmission of internal control signals as well as for sensor signal transmission. Such internal control signals can be, for instance, clock signals to specify measurement times, control signals for changeover into standby operation, and similar.

Structurally, the transmitter unit should be fixed removably to the outside of the sensor housing of the sensor unit. Because of this fixing solution, the transmitter unit as such is easily accessible from outside for maintenance or repair units. The primary purpose of the sensor housing is to house the sensor element, which it at least partly encloses. Thus the sensor housing, according to this exemplary embodiment, carries out both a housing function for the sensor element and a bearer function for the transmitter unit.

To reduce individual component variants, it is proposed that the transmission/reception units should be constructed in the same way as far as possible. The corresponding transmission/reception units which are provided between sensor element and sensor housing, as well as the transmission/reception unit which is linked to them on the transmitter side, can be equivalent parts, because of the same range of functions. However, it should be noted that the transmission/reception unit on the sensor housing must operate two link directions.

The subject of the invention can be suitable for use in connection with a flow meter, which is in the form of a Coriolis meter, the sensor element in the case of this use being an electrodynamic linear sensor. The electrodynamic linear sensor can also be used simultaneously as an electrodynamic linear actuator, to drive the Coriolis meter to vibrate. In this case, it is proposed that the transmission/reception units, as well as the contactless sensor signal transmission in the direction of the transmitter unit, are also used for contactless transmission of driving energy to the sensor element, which to this extent has a dual function. If required, the vibrating sensor element can be equipped with a frequency converter unit. The frequency converter unit prevents disturbance caused by electromagnetic induction. To keep disturbing electromagnetic forces small, the energy should be transmitted at very high or very low frequencies compared with the driving frequency. Use of a frequency converter unit is particularly suitable for the alternative of low frequency energy transmission.

BRIEF DESCRIPTION OF THE DRAWING

Further techniques which improve the invention are explained in more detail below on the basis of the only figure, together with the description of exemplary embodiments of the invention.

The FIGURE shows a schematic representation of a measuring instrument to capture a physical/chemical measured value.

DETAILED DESCRIPTION

A measuring instrument to capture a physical or chemical measured value includes a sensor unit, which is linked via a contactless interface to a transmitter unit, for passing on to a central analysis unit.

Such measuring instruments are mostly used in the form of so-called field devices of a bus system in the context of control of systems of the process engineering industry. Measuring instruments of the kind which is relevant here can be, for instance, flow meters, thermometers, pressure gauges and similar.

According to the FIGURE, the measuring instrument includes a sensor unit 1, which is linked via a contactless interface (double arrow) to an external transmitter unit 2. The transmitter unit 2 in turn creates a link to a central analysis unit 3. The sensor unit 1 essentially consists of a sensor housing 4, in which a sensor element 5 is housed. The sensor element 5 is subject to operationally caused mechanical oscillation stress, which results in vibration against the sensor housing 4, the location of which is fixed. For sensor signal transmission between the vibrating sensor element 5 and the surrounding sensor housing 4, on the side of the sensor element 5 a first transmission/reception unit 6a is provided, corresponding to a second transmission/reception unit 6b, which is fixed at a fixed location on the sensor housing 4. The linkage, which is contactless and inside the sensor unit, takes place via the link between the first transmission/reception unit 6a and the second transmission/reception unit 6b.

Additionally, a link, which is contactless and outside the sensor unit, between the above-mentioned second transmission/reception unit 6b and the transmitter unit 2 is provided. Thus the second transmission/reception unit 6b represented a contactless interface in two linkage directions. In the case of this embodiment, as well as the sensor signal transmission, transmission—which to this extent is also contactless—of operating energy for the sensor element 5 takes place via the transmission/reception units 6a-6c.

In this exemplary embodiment, operating energy is transmitted electromagnetically via the transformer principle, which is known per se. Operating energy is transmitted here in the low frequency range, and to avoid disturbance, the vibrating sensor element 5 is equipped with a frequency converter unit 7.

The transmission/reception units 6a-6c here, in addition to the contactless sensor signal transmission from the sensor element 5 in the direction of the transmitter unit 2, are also in a form for contactless transmission of driving energy to the sensor element 5, which to this extent has a dual function, and for this purpose the sensor element 5 here is an electrodynamic linear sensor/actuator of the Coriolis meter.

The invention is not restricted to the exemplary embodiments described above. Modifications of it are also conceivable, and are included in the scope of protection of the following claims.

Thus the transmission of sensor signals and in particular operating energy is not defined on the electromagnetic principle. According to use, ultrasound energy, light energy and similar can also be used for it, the transmission/reception units being matched to the transmission medium in each case.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOL LIST 1 sensor unit
2 transmitter unit
3 analysis unit
4 sensor housing
5 sensor element
6 transmission/reception unit
7 frequency converter unit

What is claimed is:

1. A measuring instrument to capture a physical/chemical measured value, comprising:
    a Coriolis meter sensor unit, wherein the sensor unit includes a sensor housing for housing an at least partly internal sensor element for vibrating against the sensor housing during operation, wherein the sensor element is an electrodynamic linear sensor, wherein the sensor element is linked, contactlessly and inside the sensor unit, for bidirectional sensor signal transmission, via a first transmission/reception unit, to a second transmission/reception unit, which is arranged at a fixed location relative to the sensor housing, and wherein the sensor element is linked, contactlessly, to a third transmission/reception unit of a transmitter unit outside the sensor housing, via the first transmission/reception unit and the second transmission/reception unit, for bidirectional sensor signal transmission.

2. The measuring instrument as claimed in claim 1, wherein the first transmission/reception unit, the second transmission/reception unit and the third transmission/reception unit are in a form for transmission of operating energy.

3. The measuring instrument as claimed in claim 2, wherein the transmitted operating energy is in the power range between 100 mW and 500 mW.

4. The measuring instrument as claimed in claim 1, wherein the first transmission/reception unit, the second transmission/reception unit and the third transmission/reception unit are in a form for transmission of internal control signals.

5. The measuring instrument as claimed in claim 2,
wherein simultaneous operating energy transmission takes place via ultrasound energy, light energy or electromagnetic energy.

6. The measuring instrument as claimed in claim 1,
wherein the transmitter unit is fixed removably to the outside of the sensor housing of the sensor unit.

7. The measuring instrument as claimed in claim 1,
wherein the transmission/reception units are constructed in the same way and the transmission/reception units operate two link directions.

8. The measuring instrument as claimed in claim 1,
wherein the vibrating sensor element is equipped with a frequency converter unit.

9. The measuring instrument as claimed in claim 6,
wherein the transmission/reception units are constructed in the same way and the transmission/reception units operate two link directions.

10. The measuring instrument as claimed in claim 1,
wherein the first transmission/reception unit and the second transmission/reception unit are configured to transmit drive energy to the sensor element.

* * * * *